United States Patent
Maloney

[11] Patent Number: 5,497,755
[45] Date of Patent: Mar. 12, 1996

[54] ENGINE CRANKCASE VENTILATION

[75] Inventor: Ronald P. Maloney, Peoria, Ill.

[73] Assignee: Caterpillar Inc., Peoria, Ill.

[21] Appl. No.: 451,948

[22] Filed: May 26, 1995

[51] Int. Cl.$^6$ ................................................ F01M 13/00
[52] U.S. Cl. .......................................................... 123/572
[58] Field of Search ................................... 123/572, 573, 123/574, 41.86

[56] References Cited

U.S. PATENT DOCUMENTS

| | | | |
|---|---|---|---|
| 4,158,353 | 6/1979 | Darnell. | |
| 4,269,607 | 5/1981 | Walker. | |
| 4,363,310 | 12/1982 | Thurston | 123/572 |
| 4,602,607 | 7/1986 | Balsley | 123/574 |
| 4,681,068 | 7/1987 | Anno et al. | 123/41.86 |
| 4,721,090 | 1/1988 | Kato | 123/572 |
| 5,347,968 | 9/1994 | Johnson, Jr.. | |

Primary Examiner—Marguerite Macy
Attorney, Agent, or Firm—Diana L. Charlton

[57] ABSTRACT

Crankcase ventilation systems for internal combustion engines generally utilize external lines which increase the complexity of the engine while decreasing the engine's flexibility. Additionally, systems which utilize internal methods for ventilating the blow-by gas leaking past the piston rings generally do not properly ventilate the crankcase. The present invention overcomes these problems by providing crankcase ventilation system which utilizes a simplified design for an internal combustion engine with hydraulically actuated valves. A passage is disposed within the engine for fluid communication between a crankcase and a combustion chamber. A valve means is disposed within the passage for controlling the communication therebetween. Either by utilizing a means for sensing the pressure within the crankcase or in sequential cycles, an intake valve is closed as the valve means is simultaneously opened by any suitable means so that blow-by gas within the crankcase flows freely through the passage to the combustion chamber for reburning. The present invention is simple, cost-effective, and eliminates additional external lines for an effective method of ventilating the crankcase.

15 Claims, 3 Drawing Sheets

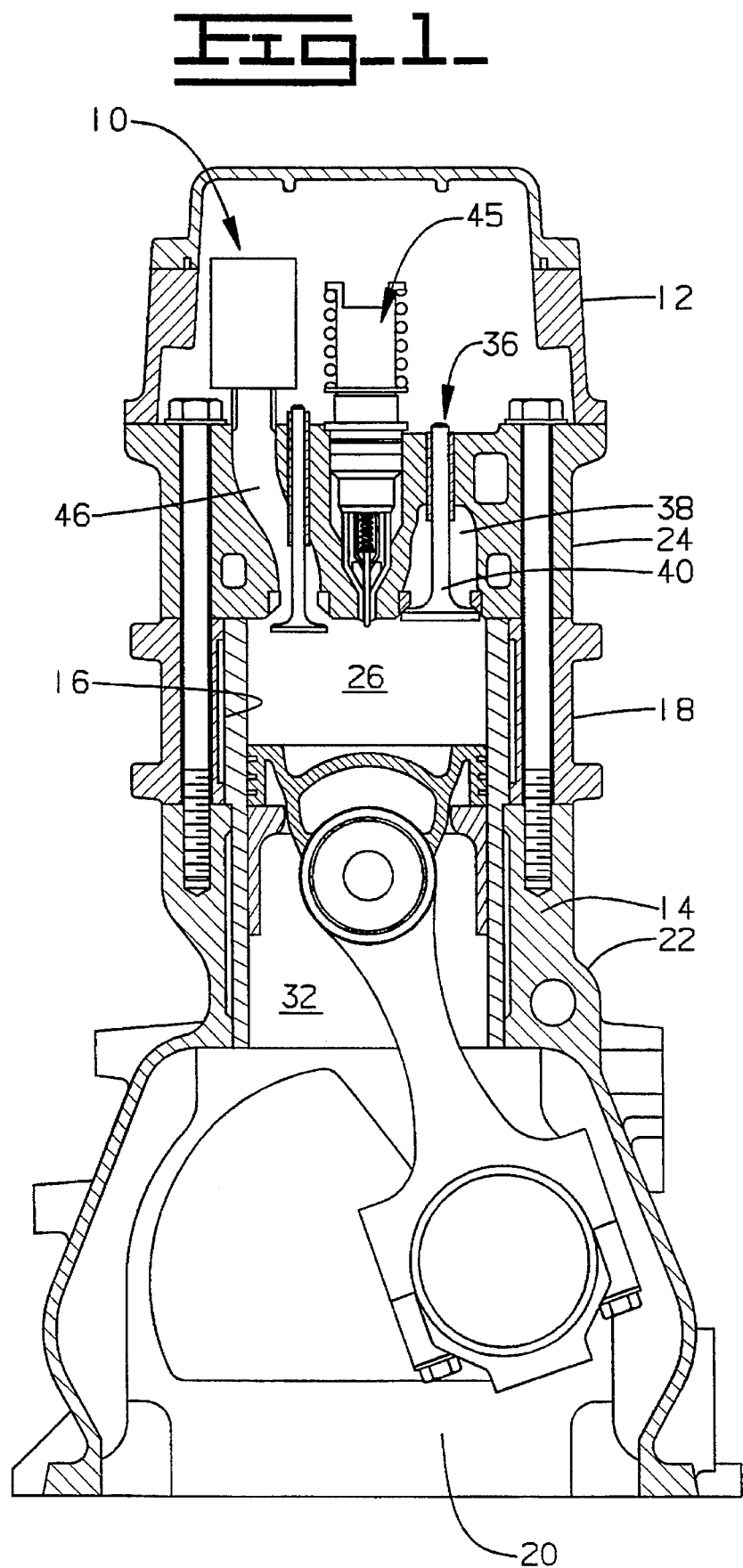
Fig_1_

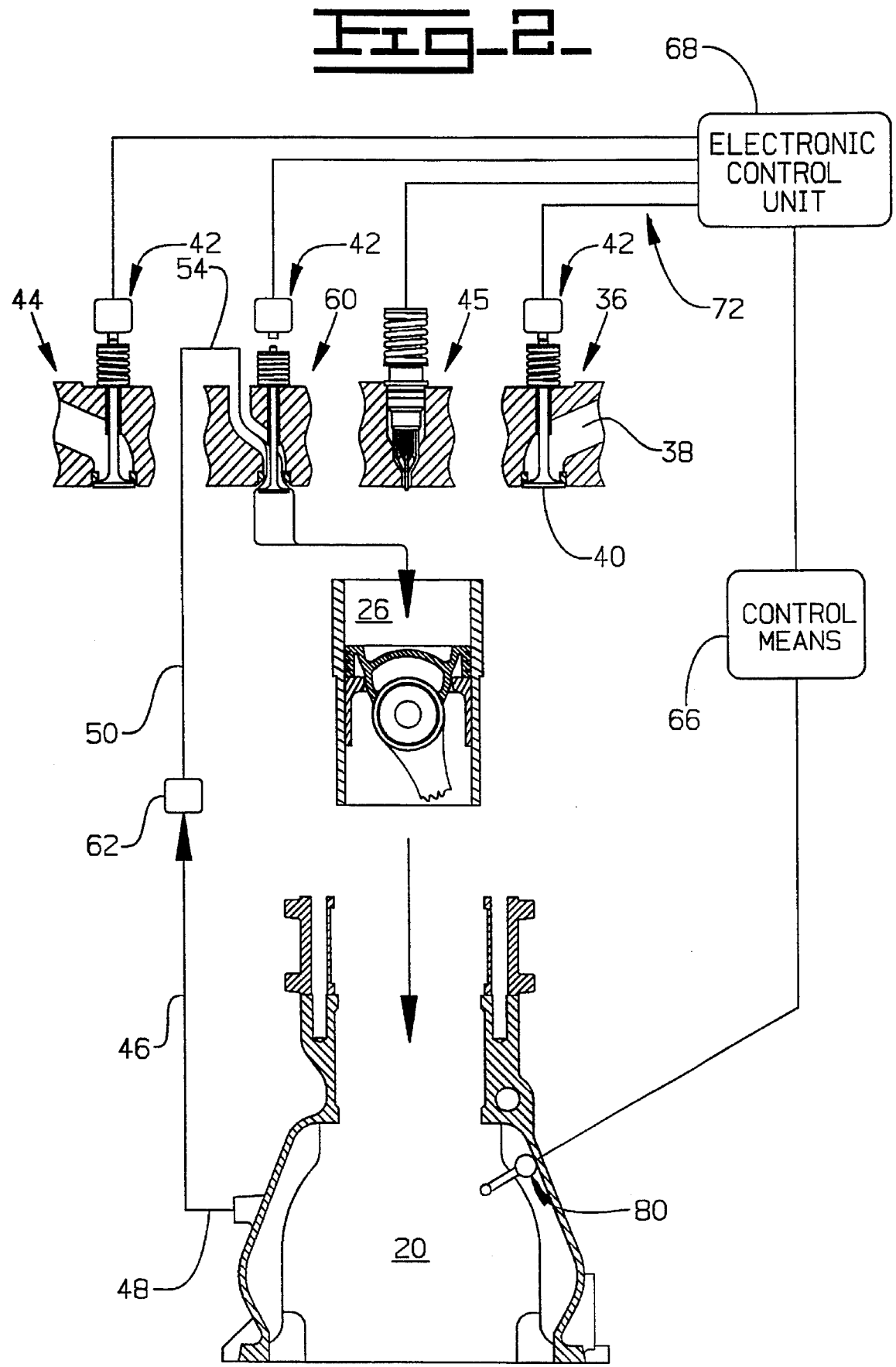
Fig_2_

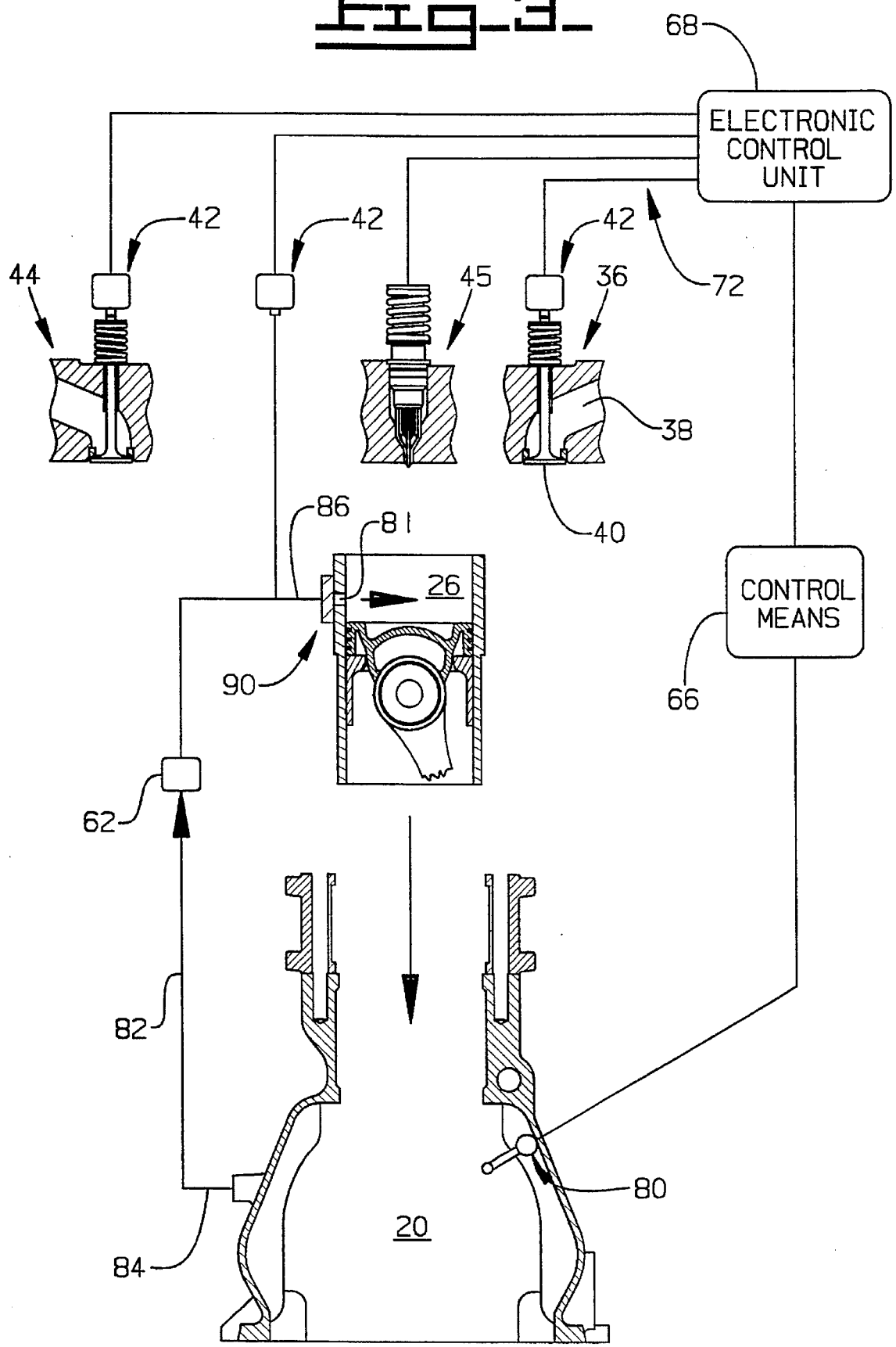

ENGINE CRANKCASE VENTILATION

TECHNICAL FIELD

This invention relates to ventilating the blow-by gas within an internal combustion engine crankcase and more particularly to a method of directing the blow-by gas toward the combustion chamber for reburning during a specified engine cycle.

BACKGROUND ART

Pressure charged diesel engines normally include a method for processing the air-fuel mixture leaking past the pistons from the combustion chambers, referred to as "blow-by gas". This processing generally includes exhausting the blow-by gas to the atmosphere which increases environmental concerns. However, the processing may include an air-oil separator for initially separating the oil from the blow-by gas so that the "cleaned" blow-by gas is introduced into the intake system through an air charging system, such as a turbocharger, for reburning in the combustion chambers. This requires that the air-oil separator be very efficient in order to remove a high percentage of the oil from the blow-by gas so that the turbocharger impeller will not become entrained with oil, lowering the efficiency of the turbocharger and, perhaps, ultimately leading to the failure of the turbocharger. Unfortunately, air-oil separators which are a complicated or expensive design may not ensure that the removal of oil will be sufficient to protect the turbocharger. Additionally, the use of the air-oil separators includes outside lines which can be damaged and add complexity and cost to the engine design.

An example of a blow-by scavenging system for a diesel engine is disclosed in U.S. Pat. No. 4,363,310 issued to Kelly W. Thurston on Dec. 14, 1982. In the preferred embodiment, the pistons of the engine are provided with blow-by storage chambers between the upper piston rings and a scavenging system to flush out blow-by gases from the storage chambers when the pistons are at or near their bottom positions. The scavenged blow-by gas is recirculated to the engine induction system or may be conducted directly to the associated combustion chambers. However, the scavenging system disclosed by Thurston will not capture the entire amount of blow-by as it passes the pistons. The portion of blow-by gas which is not captured in the scavenging system steadily accumulates within the crankcase making it necessary to, at some specified time interval, relieve the pressure therein.

The present invention includes a method of ventilating the blow-by gas within the crankcase at specified time intervals in the engine cycle and directing the blow-by gas to the combustion chamber directly without introduction through the air charging system. The present invention provides an inexpensive design for improved control of blow-by gas.

DISCLOSURE OF THE INVENTION

In one aspect of the present invention a crankcase ventilation system is adapted for use with an internal combustion engine. The internal combustion engine has a cylinder block defining a crankcase portion with blow-by gas therein and a plurality of cylinders. A piston is reciprocally disposed within each of the cylinders and movable between a top dead center position and a bottom dead center position sequentially defining an intake stroke, a compression stroke, an expansion stroke, and an exhaust stroke. A head is mounted in closing relation to the cylinder block and forms with the pistons a plurality of combustion chambers. Intake means has an open and a closed position operatively associated with each combustion chamber for permitting a flow of fresh air into each combustion chamber when in the open position. The present invention comprises means which defines a passage for fluid communication between the crankcase portion and one of the plurality of combustion chambers. Valve means is disposed within the fluid communication means and is utilized for controlling communication between the passage and the one combustion chamber with the valve means being movable between a closed and an open position. Control means is connected to the intake means and is used for closing the intake means during a predetermined intake stroke. Means is included for selectively moving the valve means to the open position to permit the blow-by gas to flow out of the crankcase portion and into the one combustion chamber during the predetermined intake stroke.

In another aspect of the present invention an internal combustion engine has a cylinder block defining a crankcase portion with blow-by gas therein and a plurality of cylinders. A piston is reciprocally disposed within each of the cylinders and movable between a top dead center position and a bottom dead center position sequentially defining an intake stroke, a compression stroke, an expansion stroke, and an exhaust stroke. A head is mounted in closing relation to the cylinder block and forms with the pistons a plurality of combustion chambers. Intake means has an open and a closed position operatively associated with each combustion chamber for permitting a flow of fresh air into each combustion chamber when in the open position. The present invention comprises means which defines a passage for fluid communication between the crankcase portion and one of the plurality of combustion chambers. Valve means is disposed within the fluid communication means and is utilized for controlling communication between the passage and the one combustion chamber with the valve means being movable between a closed and an open position. Control means is connected to the intake means and is used for closing the intake means during a predetermined intake stroke. Means is included for selectively moving the valve means to the open position to permit the blow-by gas to flow out of the crankcase portion and into the one combustion chamber during the predetermined intake stroke.

In yet another aspect of the present invention, a method is disclosed for ventilating a crankcase portion of an internal combustion engine having an intake means with an open and closed position for permitting a flow of fresh air onto a plurality of combustion chambers when in the open position. The method comprises the steps of forming a passage between the crankcase portion and one of the plurality of combustion chambers for fluid communication therebetween. Then, disposing a valve means within the passage for controlling communication between the crankcase portion and the one combustion chamber. Next, connecting a control means to the intake means for closing the intake means during a predetermined intake stroke. Finally, selectively moving the valve means to an open position to permit fluid communication between the crankcase portion and the one combustion chamber during the predetermined intake stroke.

The disadvantage of the prior art is that they fail to control the removal of blow-by gas in a predetermined timed sequence, thereby, forcing their ventilation systems to work continuously. Additionally, the prior art may expel the blow-by gas to the atmosphere increasing environmental concerns. Blow-by gas ventilation systems which direct blow-by gas toward the turbocharger can be complex and expensive and eventually lead to turbocharger failure by contaminating the impeller therein. The present invention overcomes the disadvantages of the prior art by closing the intake means at a predetermined intake stroke so that the blow-by gas is directed toward the combustion chamber in a specified timed sequence. The present invention requires few components and is simple and economical thereby minimizing cost and weight.

BRIEF DESCRIPTION OF THE DRAWINGS

FIG. 1 is a diagrammatic sectional view illustrating an internal combustion engine including an embodiment of the present invention;

FIG. 2 is a schematic view representing a first embodiment of the present invention; and FIG. 3 is a schematic view representing an alternative embodiment of the present invention.

BEST MODE FOR CARRYING OUT THE INVENTION

A crankcase ventilation system 10 for an internal combustion engine 12 with a cylinder block 14 is illustrated in FIGS. 1–3. The cylinder block 14 has a cylinder wall 15 which defines a plurality of cylinders, one of which is shown at 16 at an upper end portion 18, and a crankcase 20 at a lower end portion 22. A cylinder head 24 is mounted in closing relation to the cylinder block 14 to define a plurality of combustion chambers, one of which is shown at 26. A piston 32 is reciprocally movable within each of the cylinders 16 between a top dead center position (TDC) and a bottom dead center position (BDC) to sequentially define an intake stroke, a compression stroke, an expansion stroke, and an exhaust stroke. Henceforth, the engine 12 will be described from the perspective of a single cylinder. However, it should be understood that the present invention may be used on either a single or multiple cylinder engine. Intake means 36 is shown which is operatively associated with the combustion chamber 26 for permitting a flow of fresh air into each of the combustion chambers 26 during the intake stroke. The intake means 36 includes an intake passage 38 connected with an intake valve 40 of any suitable type, such as a popper valve. The intake valve 40 may be actuated by any suitable means 42, such as a solenoid or piezo-electric motor. However, any suitable actuation may be used, such as mechanical, electronic, hydraulic, or any combination thereof. Exhaust means 44 is shown which is operatively associated with the combustion chamber 26 for permitting a flow of burned gas from each of the combustion chambers 26 during the exhaust stroke. Exhaust means 44 is actuated by the means 42 in a similar manner as the intake means 36. Fuel injection means 45 are operatively associated with the combustion chamber 26 for injecting a preselected amount of fuel into the combustion chambers 26 during the compression stroke. It should be noted that any other suitable method for adding fuel into the combustion chambers can be used.

Referring more specifically to FIG. 2, a passage 46 having a predetermined length is defined within the cylinder block 14 extending between the crankcase 20 and the combustion chamber 26 for fluid communication therebetween. The passage 46 includes a first end portion 48 within the cylinder block 14, an intermediate portion 50, and a second end portion 54 within the cylinder head 24. A valve means 60 of any suitable type, such as a check valve, solenoid valve, poppet valve, etc., is disposed within the passage 46 for controlling fluid communication between the crankcase 20 and the combustion chamber 26. The valve means 60 is movable between a normally closed position and an open position. The valve means 60 is disposed within the passage 46 at the second end portion 54 in close proximity to the combustion chamber 26. However, it should be understood that the valve means may be located at any given position along the length of the passage 46. The valve means is actuated by the actuating means 42 is a manner similar to the intake means 36. A filter 62 of any suitable type is disposed within the passage 46 at a position between the crankcase 20 and the valve means 60.

A control means 66 is connected in any suitable manner to each of the actuating means 42 for the intake means, exhaust means, and the valve means 60. The control means 66 is a processing unit of any suitable type which is connected to an electronic control unit 68 for the combined production of an electric signal. The actuating means 42 is responsive to the electrical signal from the control unit 68 and is responsible for providing a means 72 for selectively moving the intake valve 40, exhaust valve, and valve means 60 to the open and closed position. However, it should be understood that the moving means 72 may move the valve means 60 to the open and closed position by any suitable means, such as by a mechanical or hydraulic means without being connected to the control means 66. A means 80 for sensing the pressure within the crankcase 20, such as an electronic sensor or transducer, is operatively associated with the control means 66. It should be understood that a mechanical sensor or any other suitable monitoring sensor can be used to monitor the pressure within the crankcase.

Another embodiment of the present invention is shown in FIG. 3. It should be noted that the same reference numerals of the first embodiment are used to designate similarly constructed counterpart elements of this embodiment. It should be understood that the principles and techniques for the first embodiment described can be applied to this embodiment shown and to any variations thereof.

The cylinder wall 15 defines an opening 81 therethrough which allows for fluid communication between the crankcase 20 and the combustion chamber 26. The opening 81 should be optimally positioned at least between one-third to one-half of the distance from top dead center (TDC) to bottom dead center (BDC). A passage 82 having a predetermined length extends between the opening and the crankcase 20. The passage 82 includes first and second end portions 84,86 defined within the cylinder block 14. Valve means 90, such as a rotating sleeve valve or of any suitable valve type, is positioned within the cylinder block 14 adjacent the cylinder wall 15 in close proximity to the combustion chamber 26. The valve means 90 is connected to the control means 66 in any conventional manner such as shown in FIG. 2.

Industrial Applicability

In use, the pistons 22 within the combustion chambers 20 are sequentially timed in a well-known fashion to provide the intake stroke, compression stroke, expansion stroke, and the exhaust stroke for an internal combustion engine. The timing of the internal combustion engine preferably is controlled through the use of hydraulically actuated valve events which are commonly used for rapid valve response.

Referring to FIG. 2, the electronic sensor 80 monitors the pressure within the crankcase 20. Pressure within the crankcase 20 increases as the air-fuel mixture leaking past the pistons from the combustion chambers, referred to as "blow-by gas" accumulates. When the pressure in the crankcase reaches a pre-set value, the control means 66 communicates with the control unit 68 so that an electrical signal is sent from the control unit 68 to interrupt the actuating means 42 so that the intake valve 40 remains in the closed position during the upcoming intake stroke. Simultaneously, the control unit 68 sends an electrical signal to open the valve means 60 so that the blow-by gas within the crankcase 20 flows freely through the passage 46 directly into the combustion chamber 26 for reburning during the related intake stroke. The blow-by gas is, therefore, removed from the crankcase 20 and the pressure therein is lowered to a more acceptable level. The filter 62 removes a portion of the oil in the blow-by gas before entering the combustion chamber 26 to reduce the oil burned therein.

It should be understood that the intake valve 40 may be opened during a specified period of the related intake stroke. This may occur so that a certain ratio of fresh air is mixed with blow-by gas during the related intake stroke. However, it should be understood that the intake valve 40 and the valve means 60 would generally not be opened simultaneously.

It should also be understood that the control means 66 would not have to be connected to the valve means 60 in order to achieve similar results. The process of keeping the intake valve 40 closed during a predetermined intake stroke produces a vacuum within that cylinder 16. The vacuum created in the cylinder would force the valve means 60 into the open position by the delta pressure force acting thereon, thereby, allowing the blow-by gas to flow freely through the passage 46 into the combustion chamber 26.

It should also be understood that the control unit 68 could send an electrical signal to the actuating means 42 in a predetermined timed sequence relative to cyclic operation. Therefore, the intake valve 40 would remain closed and the valve means 60 would remain open during specified intermittent sequences of the intake strokes so that the blow-by gas within the crankcase 20 would be partially removed at set intervals, virtually eliminating the accumulation of pressure therein. This method would function as intended with or without the ability to measure the pressure within the crankcase 20.

Referring to FIG. 3, the valve means 90 is actuated similar to the valve means 60. However, the valve means 90 is opened to permit blow-by gas to enter the combustion chamber through the opening 81.

It should also be understood that the control means 66 would not have to be connected to the valve means 90 in order to achieve similar results if a mechanical valve type was used, such as a reed valve. The process of keeping the intake valve 40 closed during a predetermined intake stroke produces a vacuum within that cylinder 16. The vacuum created in the cylinder would produce a pressure differential between the combustion chamber 26 and the crankcase 20 mechanically forcing the valve means 90 into the open position, thereby, allowing the blow-by gas to flow freely through the opening 81 into the combustion chamber 26.

In view of the above, it is apparent that the present invention provides an improved means for ventilating the crankcase. The present invention utilizes a simplified design for an internal combustion engine with hydraulically actuated valves. The invention has a passage for fluid communication between a crankcase and a combustion chamber with a poppet valve disposed within the passage for controlling the communication therebetween. Either by sensing the pressure within the crankcase or in sequential cycles, an intake valve is closed and the popper valve is opened by any suitable means so that blow-by gas within the crankcase flows freely through the passage to the combustion chamber for reburning. The present invention is simple, cost-effective, and eliminates additional external lines for an effective method of ventilating the crankcase.

I claim:

1. A crankcase ventilation system adapted for use with an internal combustion engine having a cylinder block defining a crankcase portion with blow-by gas therein and a plurality of cylinders, a piston reciprocally disposed within each of the cylinders and movable between a top dead center position and a bottom dead center position sequentially defining an intake stroke, a compression stroke, an expansion stroke, and an exhaust stroke, a head mounted in closing relation to the cylinder block and forming with the pistons a plurality of combustion chambers, and intake means having an open and a closed position operatively associated with each combustion chamber for permitting a flow of fresh air into each combustion chamber when in the open position, comprising:

means defining a passage for fluid communication between the crankcase portion and one of the plurality of combustion chambers;

valve means disposed within the fluid communication means for controlling communication between the passage and the one combustion chamber, the valve means being movable between the closed and the open positions;

control means connected to the intake means for closing the intake means during a predetermined intake stroke; and means for selectively moving the valve means to the open position to permit the blow-by gas to flow out of the crankcase portion and into the one combustion chamber during the predetermined intake stroke.

2. The crankcase ventilation system as in claim 1, wherein the moving means is responsive to an electrical signal from the control means.

3. The crankcase ventilation system as in claim 1, wherein the moving means is responsive to a vacuum created in one of the plurality of cylinders connected to the one combustion chamber when the intake means is in the closed position.

4. The crankcase ventilation system as in claim 1, wherein the control means closes the intake means in a predetermined timed sequence.

5. The crankcase ventilation system as in claim 1, including means connected to the crankcase portion for sensing the pressure therein, the sensing means being operatively associated with the control means so that the intake means is closed when the pressure within the crankcase portion reaches a predetermined level.

6. The crankcase ventilation system as in claim 1, wherein the passage and the valve means are disposed within the cylinder block.

7. The crankcase ventilation system as in claim 1, wherein the valve means is disposed within the head and the passage includes a first portion disposed within the cylinder block and a second portion disposed within the head.

8. An internal combustion engine having a cylinder block defining a crankcase portion with blow-by gas therein and a plurality of cylinders, a piston reciprocally disposed within each of the cylinders and movable between a top dead center position and a bottom dead center position sequentially defining an intake stroke, a compression stroke, an expansion stroke, and an exhaust stroke, a head mounted in closing relation to the cylinder block and forming with the pistons a plurality of combustion chambers, intake means having an open and a closed position operatively associated with each combustion chamber for permitting a flow of fresh air into each combustion chamber when in the open position, comprising:

means defining a passage for fluid communication between the crankcase portion and one of the plurality of combustion chambers;

valve means disposed within the fluid communication means for controlling communication between the passage and the one combustion chamber, the valve means being movable between the closed and the open positions;

control means connected to the intake means for closing the intake means during a predetermined intake stroke; and means for selectively moving the valve means to the open position to permit the blow-by gas to flow out of the crankcase portion and into the one combustion chamber during the predetermined intake stroke.

9. The crankcase ventilation system as in claim 8, wherein the moving means is responsive to an electrical signal from the control means.

10. The crankcase ventilation system as in claim 8, wherein the moving means is responsive to a vacuum created in one of the plurality of cylinders connected to the one combustion chamber when the intake means is in the closed position.

11. The crankcase ventilation system as in claim 8, wherein the control means closes the intake means in a predetermined timed sequence.

12. The crankcase ventilation system as in claim 8, including means connected to the crankcase portion for sensing the pressure therein, the sensing means being operatively associated with the control means so that the intake means is closed when the pressure within the crankcase portion reaches a predetermined level.

13. The crankcase ventilation system as in claim 8, wherein the passage and the valve means are disposed within the cylinder block.

14. The crankcase ventilation system as in claim 8, wherein the passage includes a first portion disposed within the cylinder block and a second portion disposed within the head, the valve means being disposed within the head.

15. A method of ventilating a crankcase portion of an internal combustion engine having an intake means with an open and closed position for permitting a flow of fresh air onto a plurality of combustion chambers when in the open position, comprising the steps of:

forming a passage between the crankcase portion and one of the plurality of combustion chambers for fluid communication therebetween;

disposing a valve means within the passage for controlling communication between the crankcase portion and the one combustion chamber;

connecting a control means to the intake means for closing the intake means during a predetermined intake stroke; and selectively moving the valve means to an open position to permit fluid communication between the crankcase portion and the one combustion chamber during the predetermined intake stroke.

\* \* \* \* \*